(12) United States Patent
He et al.

(10) Patent No.: US 10,204,052 B2
(45) Date of Patent: Feb. 12, 2019

(54) DIRECTORY MAINTENANCE METHOD AND APPARATUS

(71) Applicant: Huawei Technologies Co., Ltd., Shenzhen (CN)

(72) Inventors: Chenghong He, Shenzhen (CN); Yongbo Cheng, Chengdu (CN); Kejia Lan, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 246 days.

(21) Appl. No.: 14/635,163

(22) Filed: Mar. 2, 2015

(65) Prior Publication Data
US 2015/0254184 A1    Sep. 10, 2015

(30) Foreign Application Priority Data
Mar. 4, 2014    (CN) .......................... 2014 1 0076650

(51) Int. Cl.
*G06F 12/00* (2006.01)
*G06F 12/0831* (2016.01)
(Continued)

(52) U.S. Cl.
CPC ...... *G06F 12/0833* (2013.01); *G06F 12/0817* (2013.01); *G06F 12/12* (2013.01); *G06F 2212/621* (2013.01); *G06F 2212/622* (2013.01)

(58) Field of Classification Search
CPC ............. G06F 12/0817; G06F 12/0833; G06F 2212/69; G06F 2212/621; G06F 2212/622; G06F 12/12
See application file for complete search history.

(56) References Cited

U.S. PATENT DOCUMENTS

| 5,025,365 A | 6/1991 | Mathur et al. |
| 5,752,264 A | 5/1998 | Blake et al. |

(Continued)

FOREIGN PATENT DOCUMENTS

| CN | 101354682 A | 1/2009 |
| CN | 102591800 A | 7/2012 |

(Continued)

OTHER PUBLICATIONS

Foreign Communication From a Counterpart Application, Chinese Application No. 201410076650.4, Chinese Office Action dated Mar. 24, 2016, 7 pages.

(Continued)

*Primary Examiner* — Reginald G Bragdon
*Assistant Examiner* — Hannah A Faye-Joyner
(74) *Attorney, Agent, or Firm* — Conley Rose, P.C.

(57) ABSTRACT

A directory maintenance method and apparatus are provided. The method includes sending, by a main memory according to a correspondence between a cache line in a directory and a cache, listening information to each cache corresponding to a cache line at a preset frequency; receiving, by each cache corresponding to the cache line, the listening information, and sending a listening response according to the listening information; and receiving, by the main memory, the listening response, and updating the directory according to the listening response, where the listening response includes a state of the cache line in the cache sending the listening response. The directory maintenance method and apparatus that are disclosed in the present invention can lower an impact of listening caused due to replacement on normal processing of a processor, and reduce degradation of system performance.

12 Claims, 2 Drawing Sheets

(51) Int. Cl.
*G06F 12/0817* (2016.01)
*G06F 12/12* (2016.01)

(56) References Cited

U.S. PATENT DOCUMENTS

| | | | |
|---|---|---|---|
| 2003/0009631 A1 | 1/2003 | Arimilli et al. | |
| 2003/0236957 A1* | 12/2003 | Miller | G06F 12/0813 711/163 |
| 2012/0317362 A1 | 12/2012 | Hendry et al. | |
| 2015/0058570 A1 | 2/2015 | Wang et al. | |

FOREIGN PATENT DOCUMENTS

| | | |
|---|---|---|
| CN | 102880558 | 1/2013 |
| CN | 103294612 | 9/2013 |

OTHER PUBLICATIONS

Foreign Communication From a Counterpart Application, European Application No. 15156246.9, Extended European Search Report dated Jun. 24, 2015, 5 pages.
Partial English Translation and Abstract of Chinese Patent Application No. CN101354682A, Apr. 24, 2015, 24 pages.

* cited by examiner

DIRECTORY MAINTENANCE METHOD AND APPARATUS

CROSS-REFERENCE TO RELATED APPLICATION

This application claims priority to Chinese Patent Application No. 201410076650.4, filed on Mar. 4, 2014, which is hereby incorporated by reference in its entirety.

TECHNICAL FIELD

The present invention relates to the field of computer technologies, and in particular, to a directory maintenance method and apparatus.

BACKGROUND

In a multiprocessor system, each processor has a one-level or two-level cache (cache). Multiple duplicates of one piece of data may simultaneously exist in different caches. If a processor freely modifies a local duplicate, results observed by different processors may be inconsistent. In addition, modification performed by an Input Output (IO) on a main memory may also cause an inconsistency problem. To solve the problem of cache consistency, the Modified Exclusive Shared Invalid (MESI) protocol is introduced. A cache includes multiple cache lines. The MESI protocol specifies that, data in each cache line has four states: an M (Modified) state, an E (Exclusive) state, an S (Shared) state, and an I (Invalid) state, where the M state refers to that the cache line is modified and only exists in the cache; the E state refers to that the cache line is the same as the main memory and only exists in the cache; the S state refers to that the cache line is the same as the main memory and also possibly exists in another cache; and the I state refers to that the cache line is invalid and there is no such data in the cache.

Generally, a main memory of a computer system requests to access in a unit of a cache line. Current directory design provides a directory entry for each cache line to record information indicating that a remote node occupies the cache line. A cache consistency protocol of a current computer system is generally a consistency protocol based on a directory. An inclusive policy is used between the main memory and the cache, and when storage space of the main memory is insufficient, replacement needs to be performed. Invalid listening is performed on an original directory item, and then the item is written back or discarded. For M-state data, because a unique duplicate of a whole system is in the cache, when the M-state data is replaced, a write-back command is generated to write the data into the cache; however, E-state data or S-state data has not been modified in the cache, and a same duplicate also exists in the main memory; if the E-state data or the S-state data is replaced, the data is discarded according to a protocol requirement or a removal command is generated, and space is vacated to store data required by a new request.

Currently, quite a few systems use a policy of directly discarding the data, causing that directory information of a main memory is inaccurate. After the directory of the main memory is full, replacement is also caused. No matter whichever replacement policy is used, data that is being used by the cache is possibly replaced, thereby affecting performance of a whole system.

Storage space of the directory of the main memory is limited, and only data which has existed in the cache is stored in the storage space. Because directory information of the main memory is inaccurate, the main memory stores some invalid content in the cache, thereby leading to a space waste of the directory of the main memory. When the storage space is insufficient, replacement may occur. No matter whichever replacement algorithm is used, it is always possible that a replaced cache line is data being used in a processor, and when the data is replaced, normal working of the processor is interrupted, and therefore system performance is affected.

SUMMARY

Embodiments of the present invention provide a directory maintenance method, which can reduce an impact of listening caused due to replacement on normal processing of a processor, and reduce degradation of system performance.

To solve the foregoing technical problem, the embodiments of the present invention disclose the following technical solutions.

According to a first aspect, the present invention provides a directory maintenance method, where the method includes sending, by a main memory according to a correspondence between a cache line in a directory and a cache, listening information to each cache corresponding to a cache line at a preset frequency; receiving, by each cache corresponding to the cache line, the listening information, and sending a listening response according to the listening information; and receiving, by the main memory, the listening response, and updating the directory according to the listening response, where the listening response includes a state of the cache line in the cache sending the listening response.

In a first possible implementation manner of the first aspect, the main memory is a lower-level cache, and the cache is an upper-level cache.

With reference to the first aspect or the first possible implementation manner of the first aspect, in a second possible implementation manner of the first aspect, the updating the directory according to the listening response includes updating, according to the received listening response, the state of the cache line in the cache corresponding to the cache line in the directory.

With reference to the first aspect or the first possible implementation manner of the first aspect, in a third possible implementation manner of the first aspect, the updating the directory according to the listening response includes, when states, in all received listening responses, of the cache line are invalid states, deleting, by the main memory, a record of the cache line in the directory.

With reference to the first aspect or the first possible implementation manner of the first aspect, in a fourth possible implementation manner of the first aspect, the correspondence between a cache line in the directory and a cache includes each cache line corresponds to at least one cache, and each cache in the at least one cache corresponds to the state of the cache line in the cache.

According to a second aspect, the present invention provides a directory maintenance apparatus, where the apparatus includes a main memory and at least one cache, where the main memory is configured to send, according to a correspondence between a cache line in a directory and a cache, listening information to each cache corresponding to the cache line at a preset frequency, receive a listening response sent by the cache, and update the directory according to the listening response; and each cache corresponding to the cache line is configured to receive the listening information sent by the main memory, and send the listening response according to the listening information, where the listening response includes a state of the cache line in the cache sending the listening response.

In a first possible implementation manner of the second aspect, the main memory is a lower-level cache, and the cache is an upper-level cache.

With reference to the second aspect or the first possible implementation manner of the second aspect, in a second possible implementation manner of the second aspect, the main memory is configured to update, according to the received listening response, the state of the cache line in the cache corresponding to the cache line in the directory.

With reference to the second aspect or the first possible implementation manner of the second aspect, in a third possible implementation manner of the second aspect, the main memory is configured to, when states, in all received listening responses, of the cache line are invalid states, delete a record of the cache line in the directory.

With reference to the second aspect or the first possible implementation manner of the second aspect, in a fourth possible implementation manner of the second aspect, the correspondence between a cache line in the directory and a cache includes each cache line corresponds to at least one cache, and each cache in the at least one cache corresponds to the state of the cache line in the cache.

According to the directory maintenance method and apparatus provided in the embodiments of the present invention, a main memory receives listening responses sent by all caches, and updates a state of a corresponding cache line according to states, which are carried in the listening responses, of a cache line, and when all the states of the cache line are invalid, the main memory deletes a record of the cache line. In this way, storage space can be released for a directory, conditions that replacement of data being used by a processor occur can be reduced, a replacement frequency caused by the directory can be reduced, an impact of listening caused due to replacement on normal processing of the processor can be reduced, and degradation of system performance can be reduced.

BRIEF DESCRIPTION OF DRAWINGS

To describe the technical solutions in the embodiments of the present invention more clearly, the following briefly introduces the accompanying drawings required for describing the embodiments. The accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. The described embodiments are a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
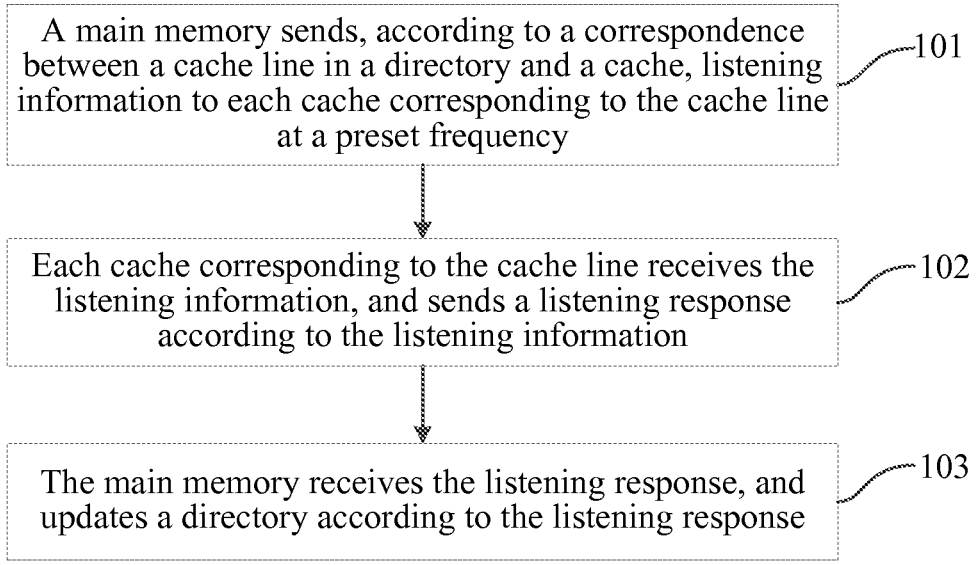
FIG. 1 is a flowchart of a directory maintenance method according to Embodiment 1 of the present invention.

This embodiment of the present invention provides a directory maintenance method. Referring to FIG. 1, the method includes the following steps.

Step 101: A main memory sends, according to a correspondence between a cache line in a directory and a cache, listening information to each cache corresponding to a cache line at a preset frequency.

Step 102: Each cache corresponding to the cache line receives the listening information, and sends a listening response according to the listening information.

Step 103: The main memory receives the listening response, and updates the directory according to the listening response.

The listening response includes a state of the cache line in the cache sending the listening response.

According to the directory maintenance method provided in this embodiment of the present invention, a state of a cache line in a cache is regularly queried, and a directory is updated according to a listening response from the cache. In this way, information in the directory can be updated in real time and kept accurate; when storage space of the directory is insufficient and replacement occurs, conditions that replacement of data being used by a processor occur can be reduced, a replacement frequency caused by the directory can be reduced, the impact of listening caused due to replacement on normal processing of the processor can be reduced, and degradation of system performance can be reduced.

The main memory may be a lower-level cache, and the cache may be an upper-level cache.

The correspondence between a cache line and a cache includes each cache line corresponds to at least one cache, and each cache in the at least one cache corresponds to the state of the cache line in the cache, where the at least one cache stores the cache line.

The updating the directory according to the listening response includes updating, according to the received listening response, the state of the cache line in the cache corresponding to the cache line in the directory.

The updating the directory according to the listening response includes, when states, in all received listening responses, of the cache line are invalid states, deleting, by the main memory, a record of the cache line in the directory.

The main memory reads valid items in the directory successively at a certain frequency, and sends listening information to a cache corresponding to a cache line that is currently read, where the main memory only needs to send one piece of listening information to one cache; a cache receiving the listening information adds a state of a corresponding cache line to the listening response without a need to change the state of the cache line in the cache.

The listening response may be identified in the following manners: RspI indicates that a state of a corresponding cache line in a cache is an I state, RspS indicates that the state of the corresponding cache line in the cache is an S state, RspE indicates that the state of the corresponding cache line in the cache is an E state, and RspM indicates that the state of the corresponding cache line in the cache is an M state. After the listening response receives the foregoing characters, a state of the cache line can be obtained by parsing.

According to the directory maintenance method provided in this embodiment of the present invention, a main memory receives listening responses sent by all caches, and updates a state of a corresponding cache line according to states, which are carried in the listening responses, of a cache line, and when all the states of the cache line are invalid, the main memory deletes a record of the cache line. In this way, storage space can be released for a directory, conditions that replacement of data being used by a processor occur can be reduced, a replacement frequency caused by the directory can be reduced, an impact of listening caused due to replacement on normal processing of the processor can be reduced, and degradation of system performance can be reduced.

Embodiment 2

Figure 2:
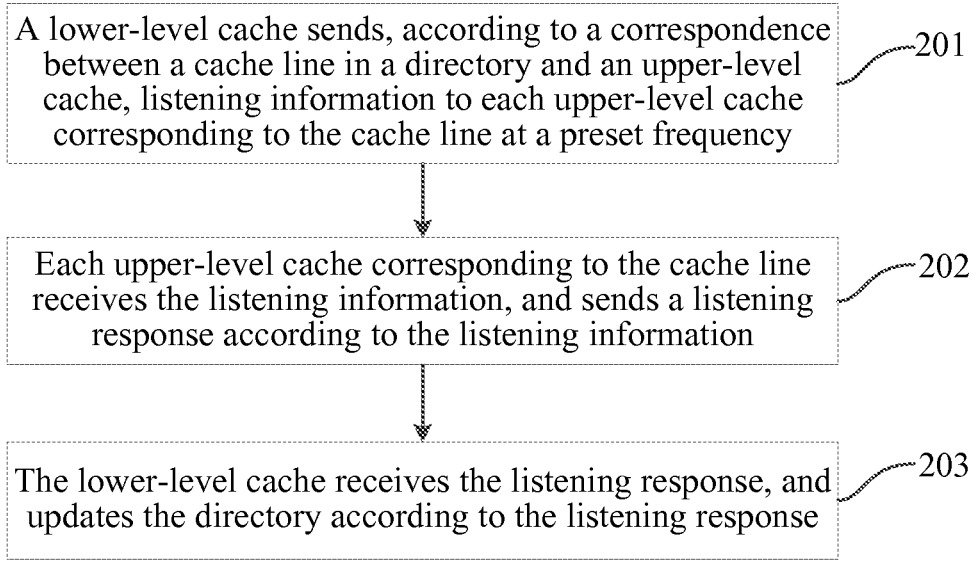
FIG. 2 is a flowchart of a directory maintenance method according to Embodiment 2 of the present invention.

Corresponding to a lower-level cache and an upper-level cache, this embodiment of the present invention provides a directory maintenance method. Referring to FIG. 2, the method includes the following steps.

Step 201: A lower-level cache sends, according to a correspondence between a cache line in a directory and an upper-level cache, listening information to each upper-level cache corresponding to a cache line at a preset frequency.

Step 202: Each upper-level cache corresponding to the cache line receives the listening information, and sends a listening response according to the listening information.

Step 203: The lower-level cache receives the listening response, and updates the directory according to the listening response.

The correspondence between a cache line and a cache includes each cache line corresponds to at least one cache, and each cache in the at least one cache corresponds to a state of the cache line in the cache, where the at least one cache stores the cache line.

The listening response includes a state of the cache line in the upper-level cache sending the listening response.

The updating the directory according to the listening response includes updating, according to the received listening response, the state of the cache line in the cache corresponding to the cache line in the directory.

The updating the directory according to the listening response includes, when states, in all received listening responses, of the cache line are invalid states, deleting, by the main memory, a record of the cache line in the directory.

Embodiment 3

Figure 3:
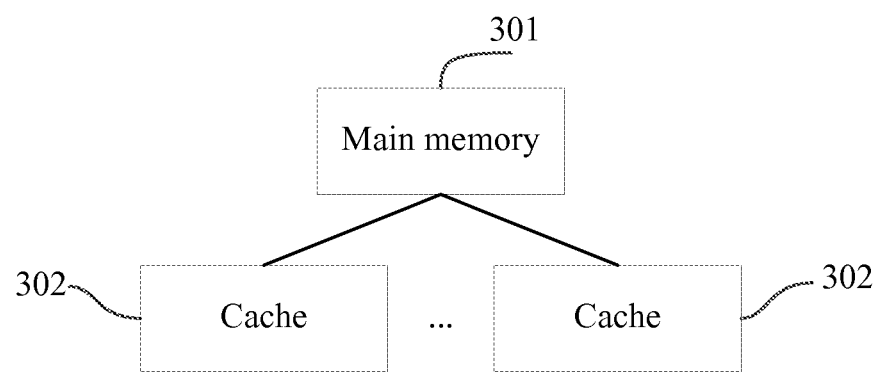
FIG. 3 is a schematic structural diagram of a directory maintenance apparatus according to Embodiment 3 of the present invention.

This embodiment of the present invention provides a directory maintenance apparatus. Referring to FIG. 3, the apparatus includes a main memory 301 and at least one cache 302, where the main memory 301 is configured to send, according to a correspondence between a cache line in a directory and a cache, listening information to each cache 302 corresponding to a cache line at a preset frequency, receive a listening response sent by the cache 302, and update the directory according to the listening response; and each cache 302 corresponding to the cache line is configured to receive the listening information sent by the main memory 301, and send the listening response according to the listening information, where the listening response includes a state of the cache line in the cache sending the listening response.

The main memory 301 may be a lower-level cache, and the cache 302 may be an upper-level cache.

The main memory 301 is configured to update, according to the received listening response, the state of the cache line in the cache corresponding to the cache line in the directory.

The main memory 301 is configured to, when states, in all received listening responses, of the cache line are invalid states, delete, by the main memory, a record of the cache line in the directory.

The correspondence between a cache line in the directory and a cache includes each cache line corresponds to at least one cache, and each cache in the at least one cache corresponds to the state of the cache line in the cache.

Because content such as an information interaction and an execution process between units in the foregoing apparatus is based on a same concept as the method embodiments of the present invention. For specific content, reference may be made to the description in the method embodiments of the present invention, and details are not described herein again.

It should be noted that, the method provided in the embodiments of the present invention is applicable to a multi-level cache structure, between an upper-level cache and a lower-level cache, or between node controllers (NCs). A specific implementation process is based on a same concept as the method embodiments of the present invention. For specific content, reference may be made to the description in the method embodiments of the present invention, and details are not described herein again.

It can be seen from the foregoing description that, the method and the apparatus provided in the embodiments of the present invention have the following beneficial effects.

1. According to the method and the apparatus provided in the embodiments of the present invention, a main memory receives listening responses sent by all caches, and updates a state of a corresponding cache line according to states, which are carried in the listening responses, of a cache line, and when all the states of the cache line are invalid, the main memory deletes a record of the cache line. In this way, storage space can be released for a directory, conditions that replacement of data being used by a processor occur can be reduced, a replacement frequency caused by the directory can be reduced, an impact of listening caused due to replacement on normal processing of the processor can be reduced, and degradation of system performance can be reduced.

2. According to the method and the apparatus provided in the embodiments of the present invention, a directory state is updated in real time, and an invalid cache line in the directory is deleted; therefore, actual utilization of the directory and the cache can be improved, listening information does not affect a state of data in the cache, and data processing of the processor is not affected.

A person of ordinary skill in the art may understand that, each aspect of the present invention or a possible implementation manner of each aspect may be implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM) or flash memory, an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may in fact be executed substantially at the same time, or these blocks may sometimes be executed in reverse order.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for maintaining a directory of cache line information, the directory comprising a plurality of entries comprising states of a plurality of cache lines that are stored in a plurality of caches, the caches including one or more first caches indicated in the directory as corresponding to a first cache line, each entry corresponding to at least one cache in the plurality of caches, and the method comprising:
   querying states of the plurality of cache lines by sending, at a preset frequency by a main memory, listening information to each of the plurality of caches;
   receiving, by the one or more first caches from the main memory, the listening information;
   in response to receiving the listening information, sending, by the one or more first caches to the main memory, one or more listening responses, each of the one or more listening responses received from the one or more first caches including state information that indicates a modified, exclusive, shared, or invalid (MESI) state of the first cache line in the cache sending the listening response;
   receiving, by the main memory from the one or more first caches, the one or more listening responses sent by the one or more first caches; and
   updating, by the main memory, a first entry in the directory according to the one or more listening responses sent by the one or more first caches.

2. The method according to claim 1, wherein the main memory is a lower-level cache, and each cache in the plurality of caches is an upper-level cache.

3. The method according to claim 1, wherein updating the first entry in the directory according to the one or more listening responses comprises updating the MESI state of the first cache line of the first entry in the directory.

4. The method according to claim 1, wherein updating the first entry in the directory according to the one or more listening responses comprises deleting, by the main memory, the first entry in the directory when the MESI state in each of the one or more listening responses is the invalid state.

5. The method according to claim 1, wherein the MESI state of the first cache line is not changed responsive to the listening information.

6. The method according to claim 1, wherein sending the one or more listening responses includes at least one of the one or more first caches sending a listening response when the MESI state of the first cache line in the at least one cache is in the invalid state.

7. The method according to claim 6, wherein the MESI state of the first cache line in the at least one cache is not changed responsive to the listening information.

8. The method according to claim 1, wherein sending the one or more listening responses includes at least one of the one or more first caches sending a listening response when the MESI state of the first cache line in the at least one cache is in the shared state.

9. A directory maintenance apparatus, comprising:
   a plurality of caches;
   a directory coupled to the plurality of caches, the directory comprising a plurality of entries comprising states of a plurality of cache lines that are stored in the plurality of caches, the plurality of caches including one or more first caches indicated in the directory as corresponding to a first cache line; and
   a main memory coupled to the plurality of caches and the directory and configured to:
      query states of the plurality of cache lines in the plurality of caches by sending, at a preset frequency, listening information to each cache of the plurality of caches;
      receive one or more listening responses from the one or more first caches; and
      update a first entry in the directory according to the one or more listening responses, and
   each of the one or more first caches being configured to:
      receive the listening information from the main memory; and
      in response to receiving the listening information, send one of the one or more listening responses to the main memory, each of the one or more listening responses comprising state information that indicates a modified, exclusive, shared, or invalid (MESI) state of the first cache line in the cache sending the listening response.

10. The apparatus according to claim 9, wherein the main memory is a lower-level cache, and each cache of the plurality of caches is an upper-level cache.

11. The apparatus according to claim 9, wherein the main memory is configured to update the first entry in the director to indicate the MESI state of the first cache line.

12. The apparatus according to claim 9, wherein the main memory is configured to delete the first entry in the directory when the MESI state of each of the one or more listening responses is the invalid state.

* * * * *